(12) United States Patent
Martin et al.

(10) Patent No.: US 8,544,909 B2
(45) Date of Patent: Oct. 1, 2013

(54) MANUAL LIFTING DEVICE

(75) Inventors: John B. M. Martin, Badjeros (CA); Ashwani Kapur, Kitchener (CA); Kailash C. Vasudeva, Waterloo (CA)

(73) Assignee: Maxtech Consumer Products Limited, Waterloo (CA)

( * ) Notice: Subject to any disclaimer, the term of this patent is extended or adjusted under 35 U.S.C. 154(b) by 0 days.

(21) Appl. No.: 13/460,995

(22) Filed: May 1, 2012

(65) Prior Publication Data

US 2012/0286530 A1  Nov. 15, 2012

Related U.S. Application Data

(60) Provisional application No. 61/483,823, filed on May 9, 2011.

(51) Int. Cl.
*B66C 1/42* (2006.01)

(52) U.S. Cl.
USPC ............................. 294/16; 294/62; 294/106

(58) Field of Classification Search
USPC ................. 294/16, 106, 13, 15, 27.1, 28, 62, 294/116; 16/422, 425
See application file for complete search history.

(56) References Cited

U.S. PATENT DOCUMENTS

| | | | | |
|---|---|---|---|---|
| 1,014,079 | A * | 1/1912 | Mckay | 294/62 |
| 1,249,723 | A * | 12/1917 | Danielson | 294/62 |
| 1,806,956 | A * | 5/1931 | Smith | 294/106 |
| 2,828,155 | A * | 3/1958 | Schwankl | 294/16 |
| 2,829,917 | A * | 4/1958 | Wiora | 294/90 |
| 3,436,112 | A * | 4/1969 | Pasquine | 294/62 |
| 4,678,218 | A * | 7/1987 | Babcock | 294/16 |
| 5,794,999 | A * | 8/1998 | Corsaro | 294/16 |
| 5,820,180 | A * | 10/1998 | Haupt | 294/16 |
| 6,481,767 | B2 * | 11/2002 | Pool | 294/16 |
| 7,240,934 | B2 * | 7/2007 | Lausell | 294/16 |

* cited by examiner

*Primary Examiner* — Paul T Chin
(74) *Attorney, Agent, or Firm* — R. Craig Armstrong

(57) ABSTRACT

The manual lifting device has a first and second arms, pivotally connected to each other, each having a downward projection from a distal end thereof, extending generally vertically when in use. A handle is mounted on one of the arms, extending generally over the center of gravity of the device. Positioning the device so that the downward projections loosely contact edges of an object to be lifted, and then lifting the handle, causes the arms to pivot downwardly relative to each other, thereby causing the downward projections to rotate inwardly to grasp the object. Alternatively, there is a central handle, and the two arms pivot downwardly from opposite ends of the handle.

10 Claims, 20 Drawing Sheets

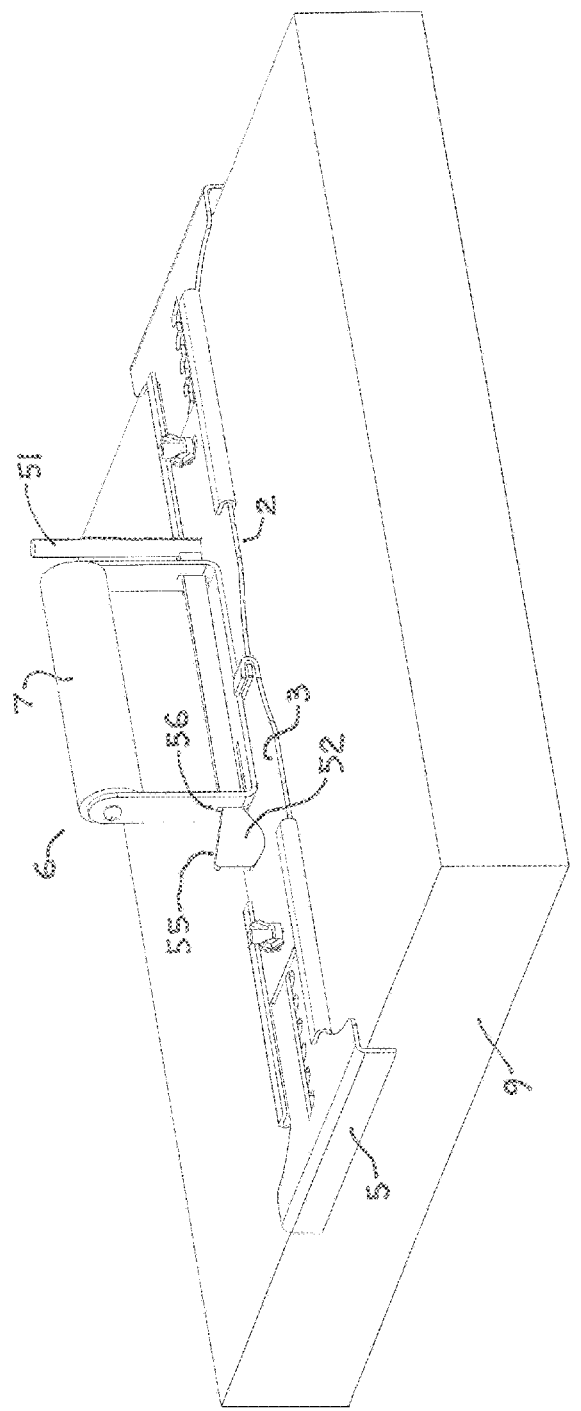

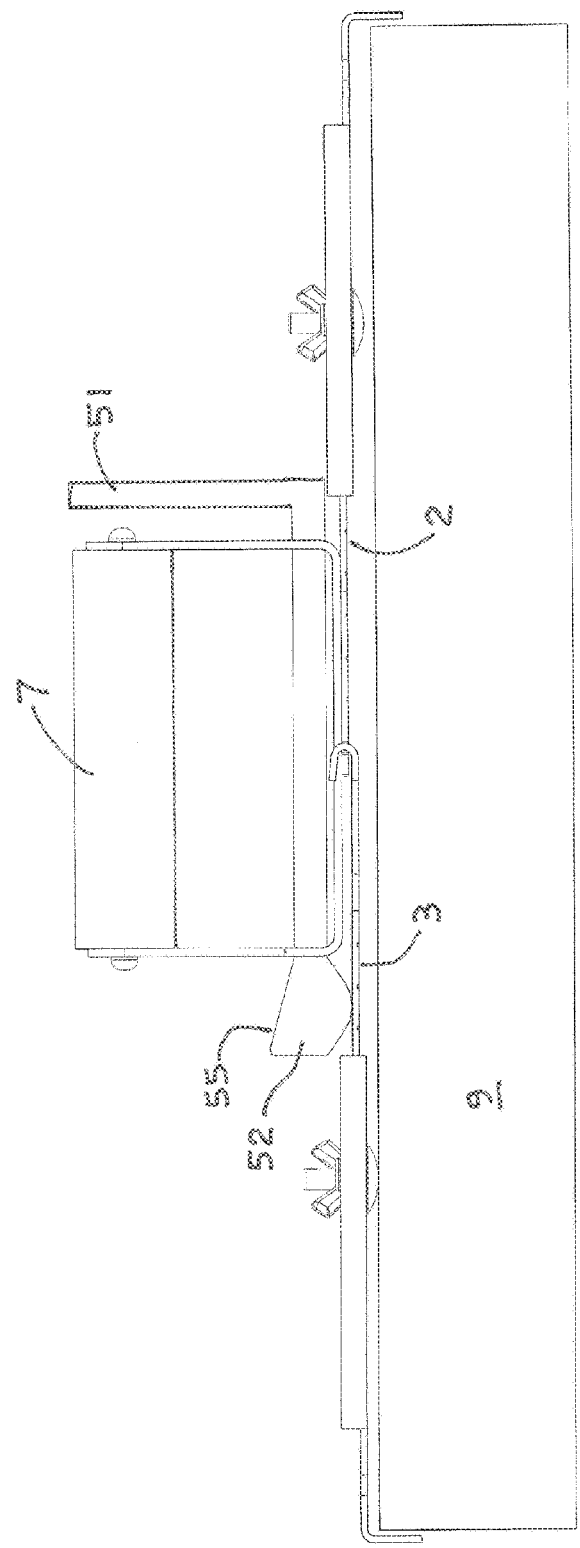

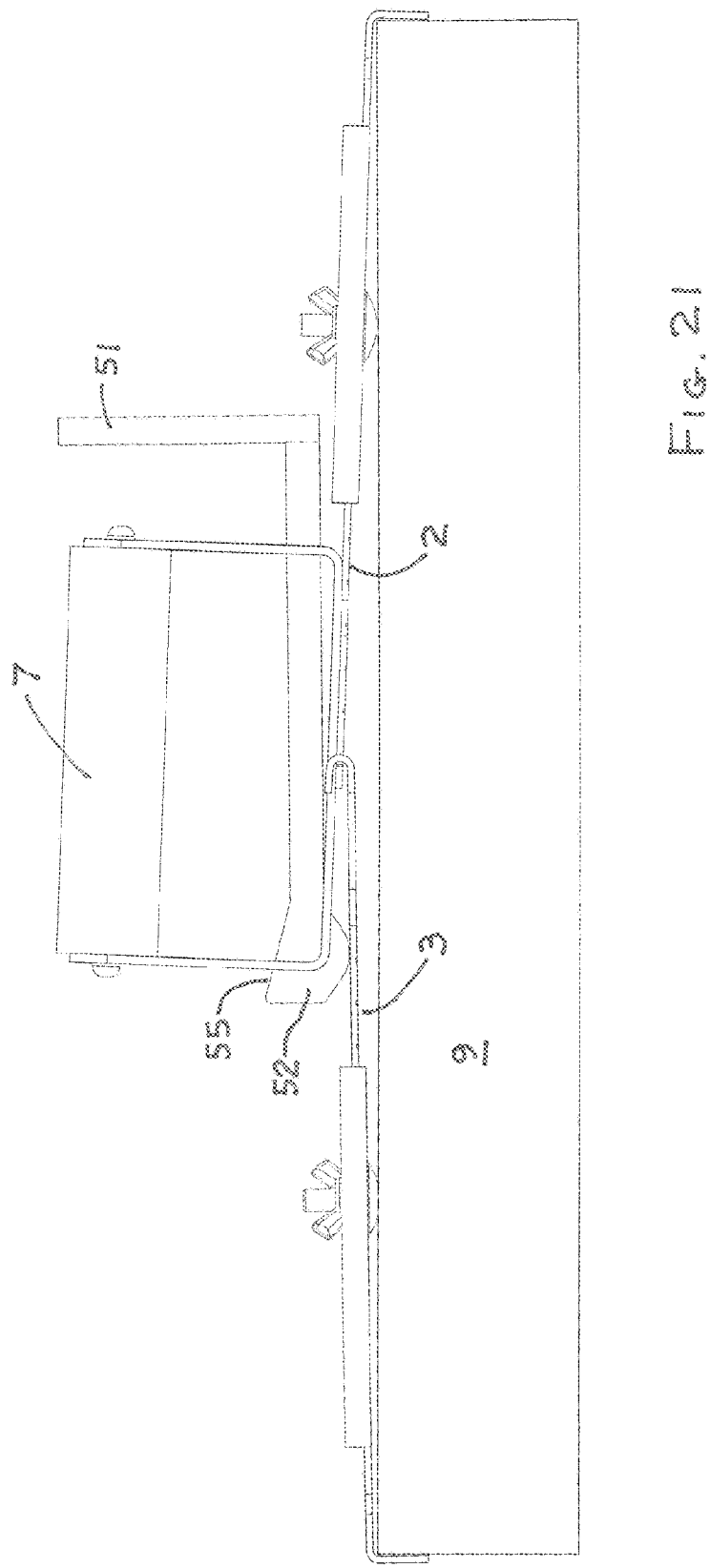

US 8,544,909 B2

MANUAL LIFTING DEVICE

REFERENCE TO RELATED APPLICATION

This is a formal application based on and claiming the benefit of provisional application No. 61/483,823 filed May 9, 2011.

BACKGROUND OF THE INVENTION

This invention relates to manual lifting devices and aids, and in particular to a manual lifting device to facilitate lifting of heavy or awkward items such as patio stones, cement blocks and other similar items.

For very large or heavy objects, machines such as forklift trucks, or hydraulic jacks or the like, may be required to lift and move the objects. For relatively light articles such as ceramic floor tiles or the like, lifting and moving them by hand may not be a problem.

However, for certain other items such as patio stones or cement blocks, it is common to lift them unaided, even though doing so may involve much more effort than is really necessary, and may expose the person doing the lifting to unnecessary strain and risk of injury. With patio stones, for example, it can be difficult to lift a corner or edge to get a grip, and then it may be difficult or awkward to actually lift the patio stone.

Accurately placing the patio stones or the like can be difficult, too, especially if closely spaced such that it is difficult or impossible to lower them all the way by hand. Often, one edge is positioned approximately and the patio stone is rotated downwardly into place, or it may be lowered by hand to a position just above its intended position and then dropped into place. In either case, accurate positioning is difficult.

SUMMARY OF THE INVENTION

In view of the preceding, it is an object of the invention to provide a manual lifting device to aid in lifting objects such as patio stones, cement blocks and other like objects.

In one embodiment of the invention, the device has a first arm, having a downward projection from a distal end thereof, the downward projection extending generally vertically when in use, and a second arm, pivotally connected to the first arm at respective proximal ends of the arms, the second arm also having a downward projection from a distal end thereof, the downward projection extending generally vertically when in use. A handle is mounted on one of the arms, extending generally over the center of gravity of the device. Positioning the device such that the downward projections loosely contact edges of an object to be lifted, and then lifting the handle, causes the arms to pivot downwardly relative to each other, thereby causing the downward projections to rotate inwardly to grasp the object. The patio stone or other object can then be lifted easily, and also can be moved to its intended location easily, and lowered into position easily and with greater accuracy than is normally possible just by hand.

In a similar embodiment, there is a handle assembly, and the first and second arms are pivotally connected to opposite outer ends of the handle assembly, the structure and operation otherwise being substantially similar.

Further details of the invention will be described or will become apparent in the course of the following detailed description and drawings of specific embodiments of the invention, as examples.

BRIEF DESCRIPTION OF THE DRAWINGS

Embodiments of the invention will now be described, by way of example only, with reference to the attached drawings, in which:

FIG. 19 is a perspective view of a similar safety mechanism, not engaged;

FIG. 20 is a side view of the FIG. 19 safety mechanism, not engaged; and

FIG. 21 is a side view of the FIG. 19 safety mechanism, engaged.

DETAILED DESCRIPTION OF THE INVENTION

Figure 1:
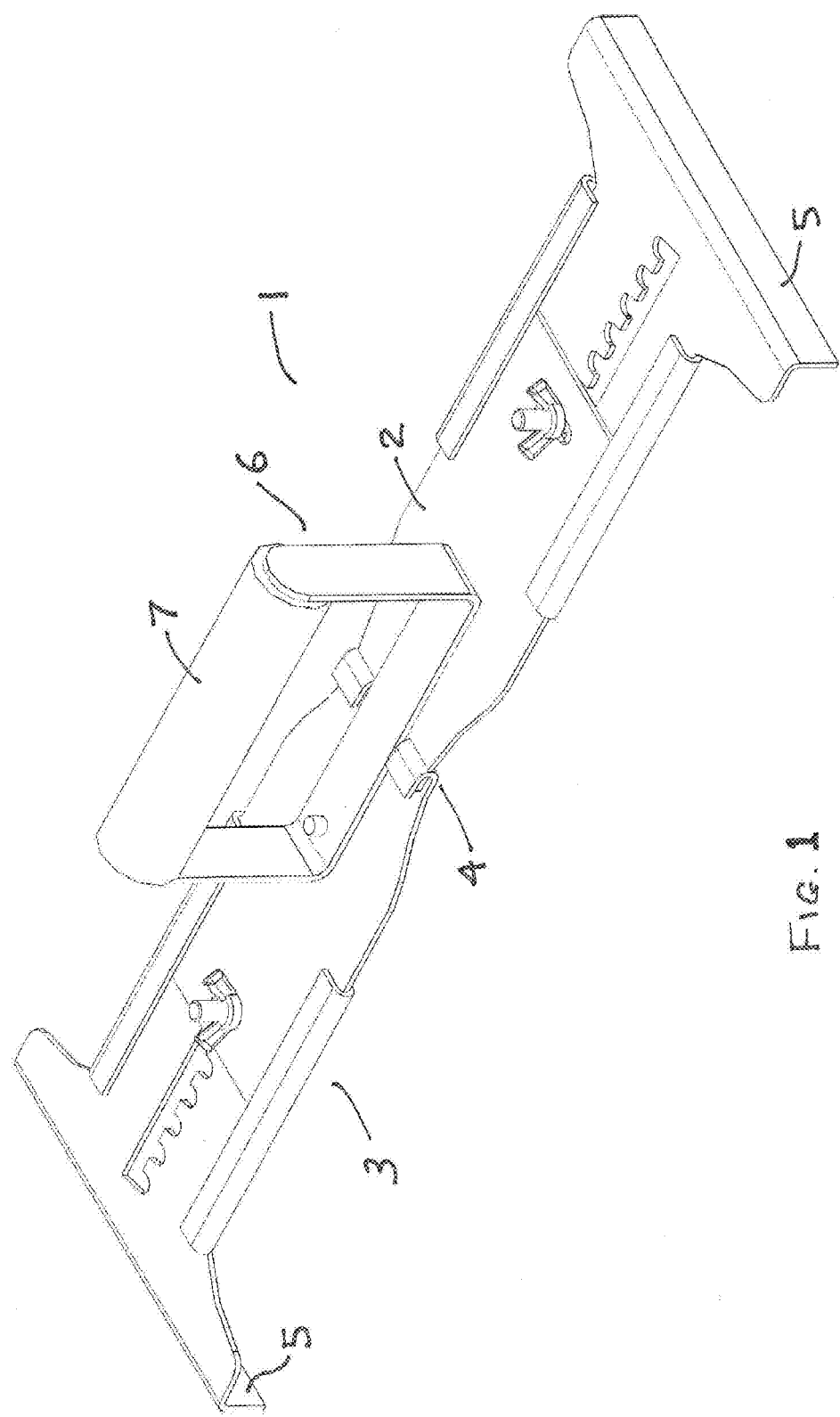
FIG. 1 is a perspective view of a first embodiment.
Figure 2:
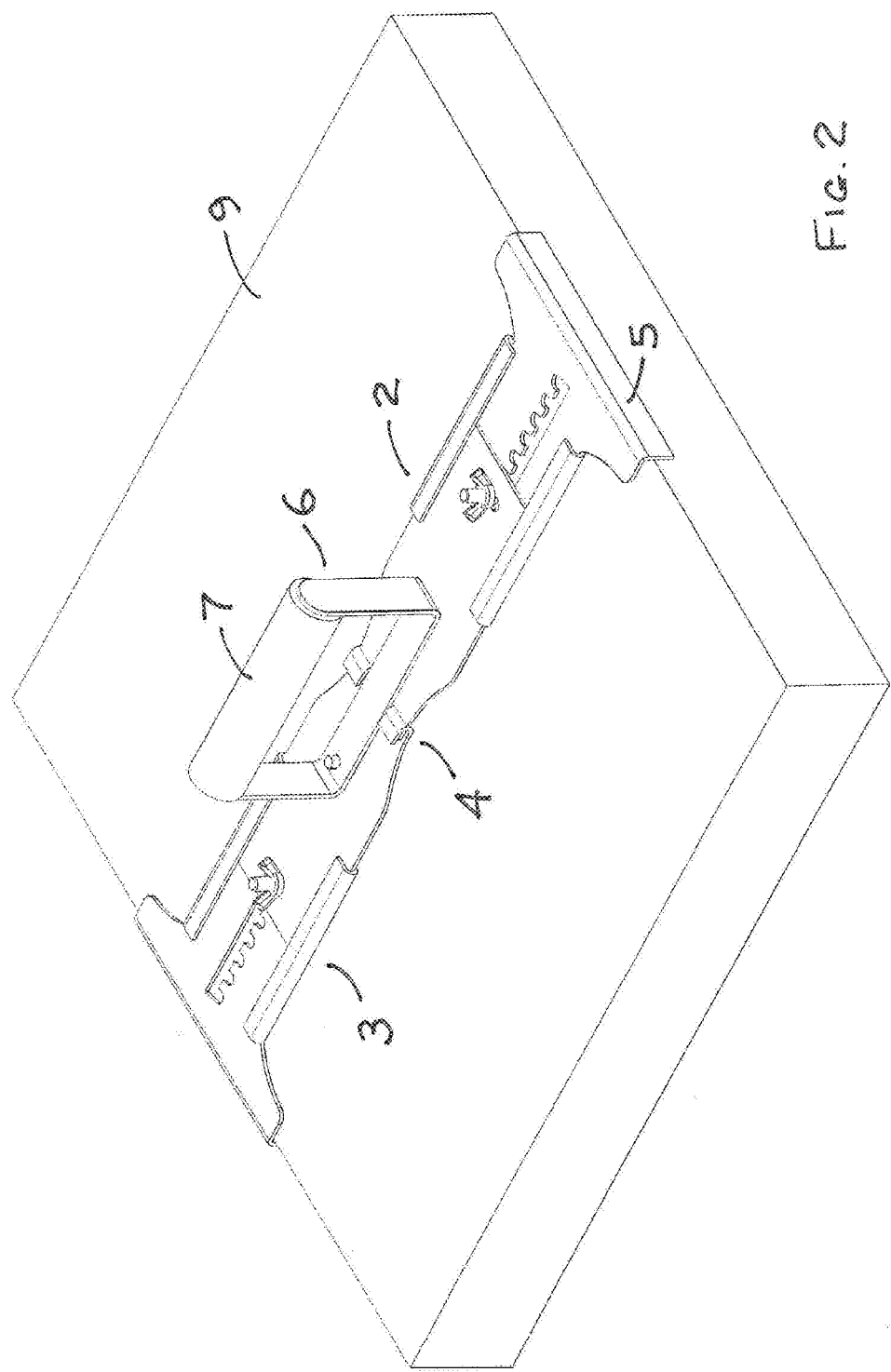
FIG. 2 is a perspective view of the first embodiment, shown carrying a patio stone.
Figure 3:
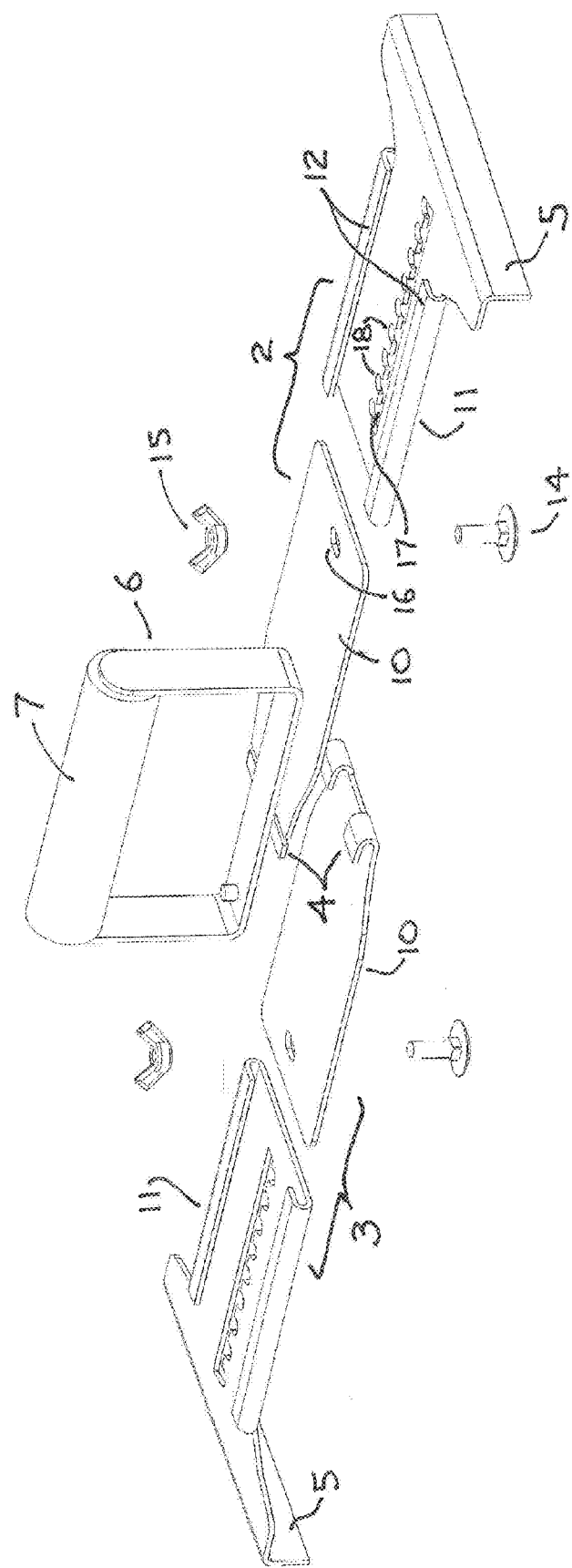
FIG. 3 is an exploded perspective view of the first embodiment.
Figure 4:
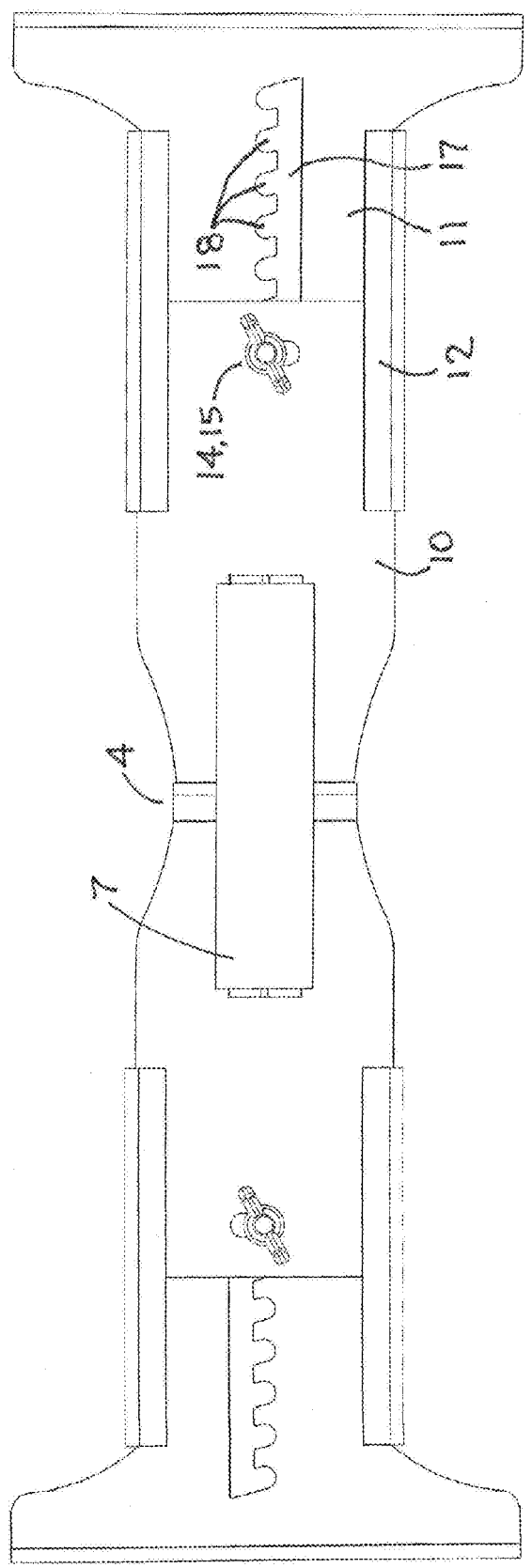
FIG. 4 is a top view of the first embodiment.
Figure 5:
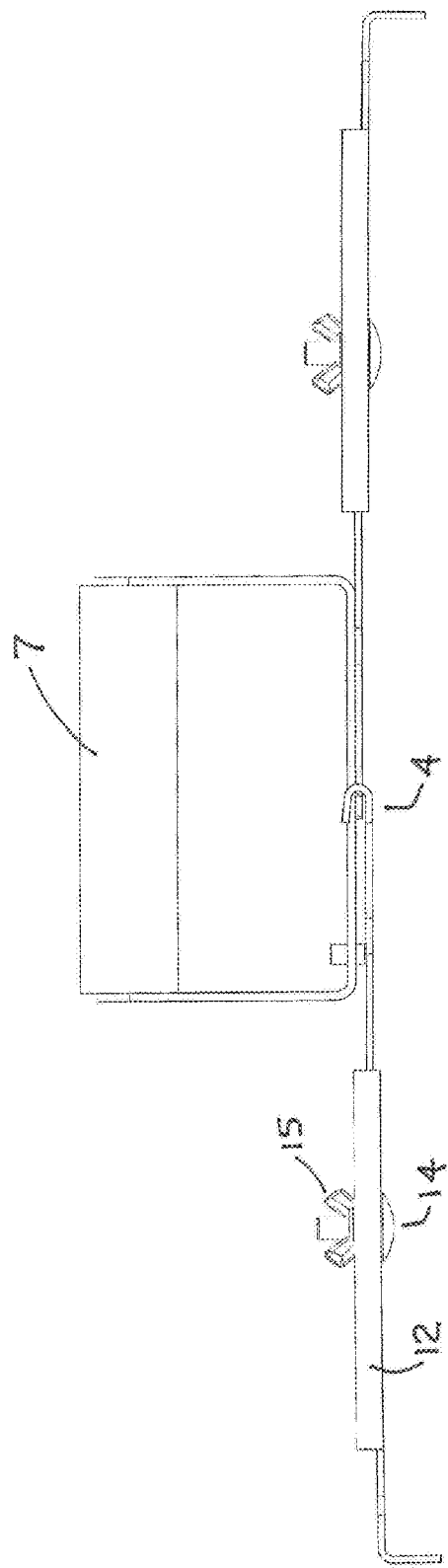
FIG. 5 is side view of the first embodiment.
Figure 6:
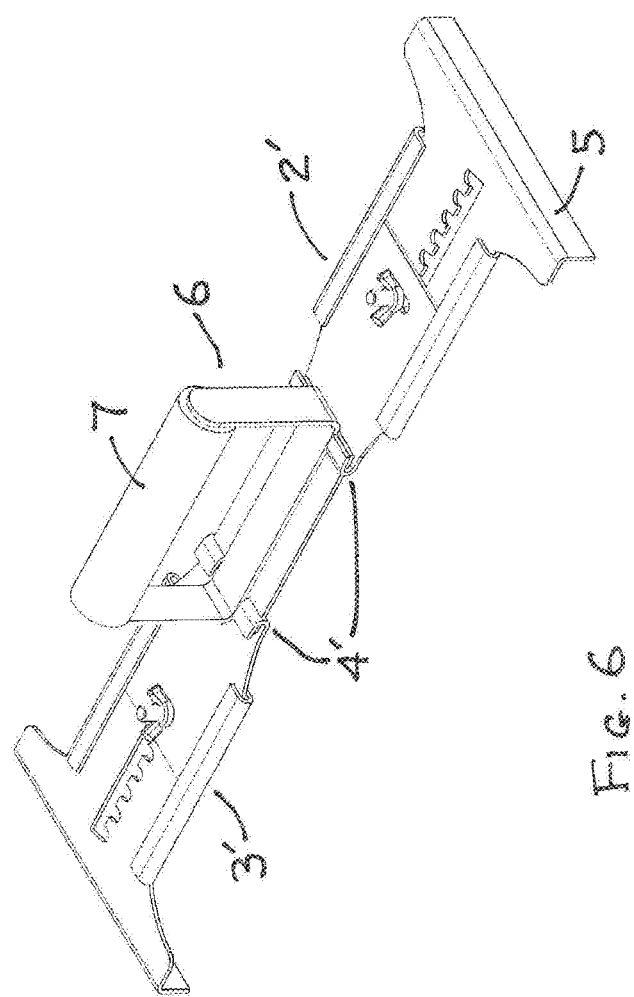
FIG. 6 is a perspective view of a second embodiment.
Figure 7:
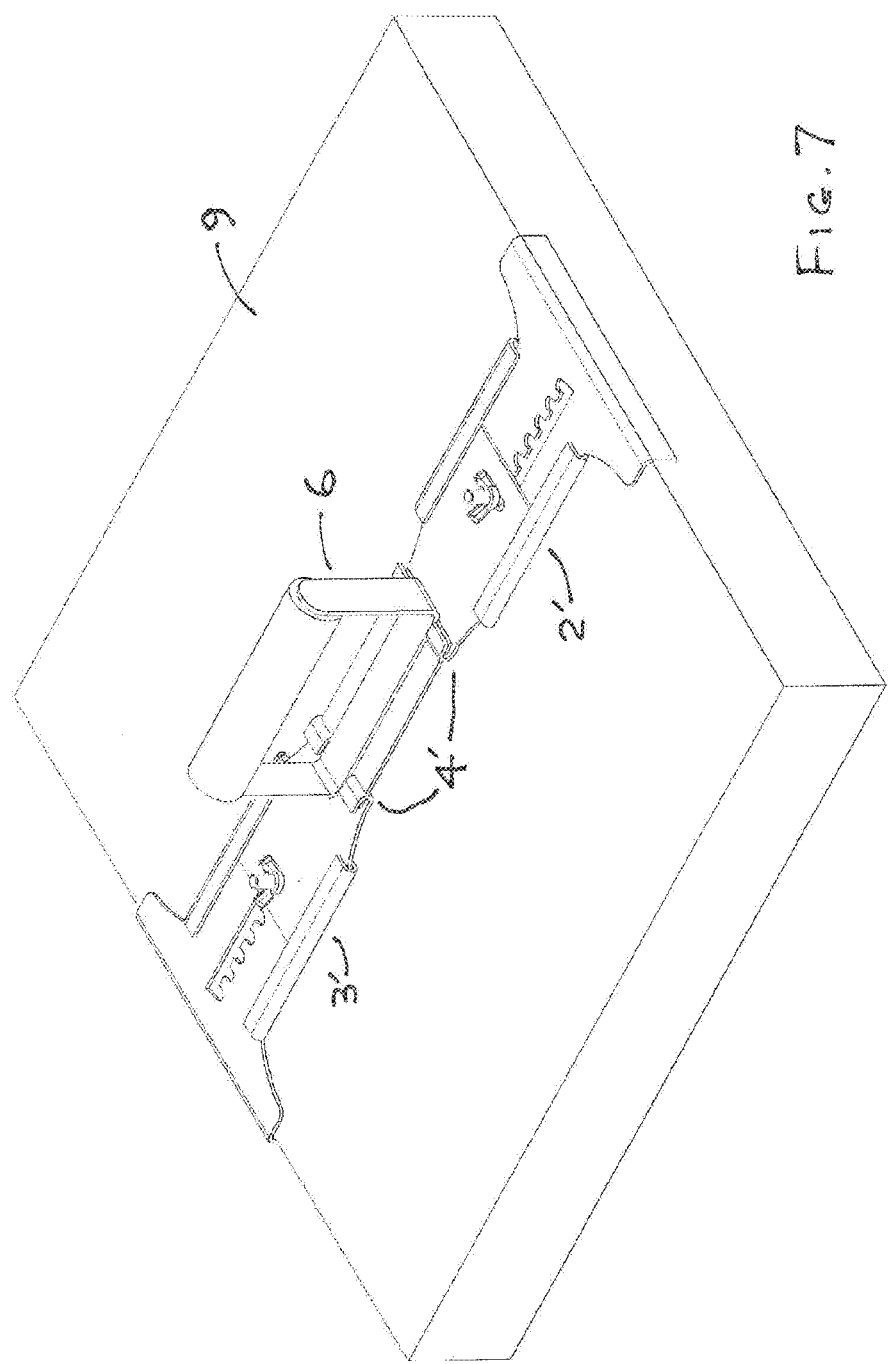
FIG. 7 is a perspective view of the second embodiment, shown carrying a patio stone.
Figure 8:
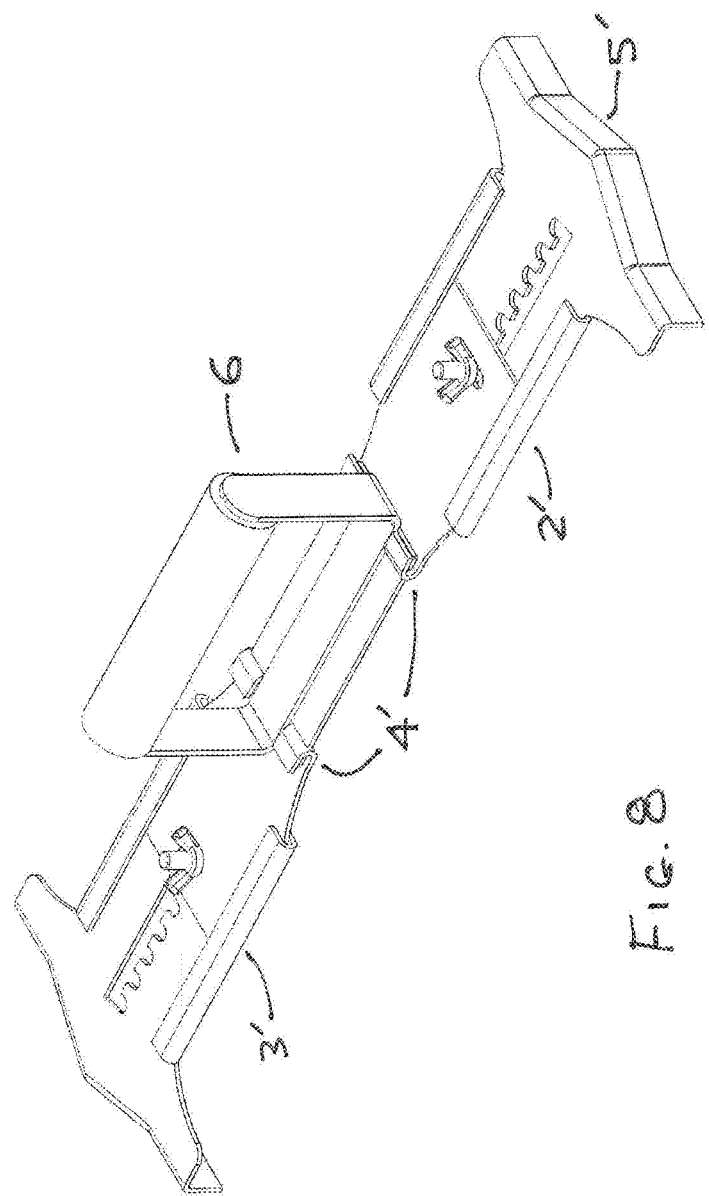
FIG. 8 is a perspective view of a variation of the second embodiment, better adapted for either round or oblong pieces.

In a first embodiment, as shown in FIGS. 1-5, the manual lifting device 1 has a first and second arms 2 and 3 respectively, preferably but not necessarily extending generally horizontally when in use. The arms are pivotally connected to each other at proximal ends thereof, by a hinge 4. Each arm has a downward projection 5 from a distal end thereof, extending generally vertically when in use. Conveniently, the first and second arms may be generally horizontal when in use, but they could be angled relative to each other as long as the downward projections 5 are still generally vertical.

One of the arms, for example the first arm 2, has a handle assembly 6 mounted thereon, its grip portion 7 extending generally over the center of gravity of the device and thus generally over the center of gravity of the object being lifted and carried, which may be a patio stone 9 for example.

As can be readily appreciated from the drawings, positioning the device such that the downward projections 5 loosely contact edges of the object to be lifted, and then lifting the handle, causes the arms 2 and 3 to pivot downwardly relative to each other, thereby causing the downward projections to rotate inwardly to grasp the object.

Although the drawings illustrate a horizontally-oriented object such as a patio stone, it should be understood that the device can also be used for vertically-oriented items as well. For example, a patio stone stored vertically can be lifted by positioning the device along the upper edge of the patio stone, to grasp opposite side edges.

For storage purposes, it would be preferable for the hinge 4 to allow a full range of motion so that the arms 2 and 3 could be folded flat against each other. However, this would not be convenient in use, since the arms would tend to fold down against each other and would have to be manually moved to a generally horizontal position each time that an object was to be lifted. Therefore, preferably the hinge has a restricted range of motion, so that the arms remain spread apart and the downward projections "automatically" spread sufficiently far apart to be easily positioned on the object. In the preferred embodiment, the hinge is formed by having tabs on opposite sides of the inner end of one of the arms folded back on themselves, as can be readily seen from the drawings, and that folded tabs being fitted in corresponding slots in the other arm. The configuration of the folds and the slots restricts the range of motion of the hinge, as can be readily seen from the drawings.

In the preferred embodiment, the arms 2 and 3 are generally horizontal. However, though not illustrated, it should be clear that there could be a substantial angle between the two arms. In that case, the downward projections 5 would be configured to still extend generally vertically when in use.

An important feature is that the length of the arms is preferably adjustable, so that objects of different sizes may be lifted. Of course, various sizes of fixed-length arms could be marketed, corresponding to objects having standardized dimensions, but adjustable arms provide greater flexibility by allowing different-sized objects to be lifted.

In the illustrated embodiments, the adjustability is provided by each arm 2 and 3 having two sections, namely inner sections 10 and outer sections 11. The inner and outer sections telescope relative to each other, for example by each outer section having folded-over edges 12 defining a channel in which the corresponding inner section can slide. Locking means such as a bolt 14 and wingnut 15 are used to secure the sections to each other, the bolt passing through a hole 16 in one arm and a slot 17 in the other arm. To prevent accidental release, the bolt engages one of a number of bays 18 extending off the slot 17. Preferably those bays are angled slightly, as can be best seen from FIG. 4, such that the forces generated from lifting an object tend to force the bolts into the bays, preventing accidental release.

It is important that the handle should remain generally over the center of gravity of the patio stone 9 or other object, so that the object remains generally horizontal instead of being inclined. Therefore, the arms should be adjusted equally, i.e. so that the downward projections 5 are approximately the same distance out from the center of the handle. If desired, the various bays 18 could therefore be numbered or color-coded, with instructions that the numbers or colors should be matched for each arm.

In a second embodiment, illustrated in FIGS. 6-11, the principle is the same, but the arms are separately hinged to the handle assembly instead of to each other. A first arm 2' is pivotally connected to an outer end of the handle assembly 6, and a second arm 3' is pivotally connected to an opposite outer end of the handle assembly, via hinges 4'. Otherwise this embodiment is substantially the same as the previous embodiment.

With this embodiment, it should be noted that the easiest way to remove the device from the object once the object is on the ground is to lower the handle so that no weight is being borne, and then rotate the handle about its axis, i.e. laterally.

Figure 9:
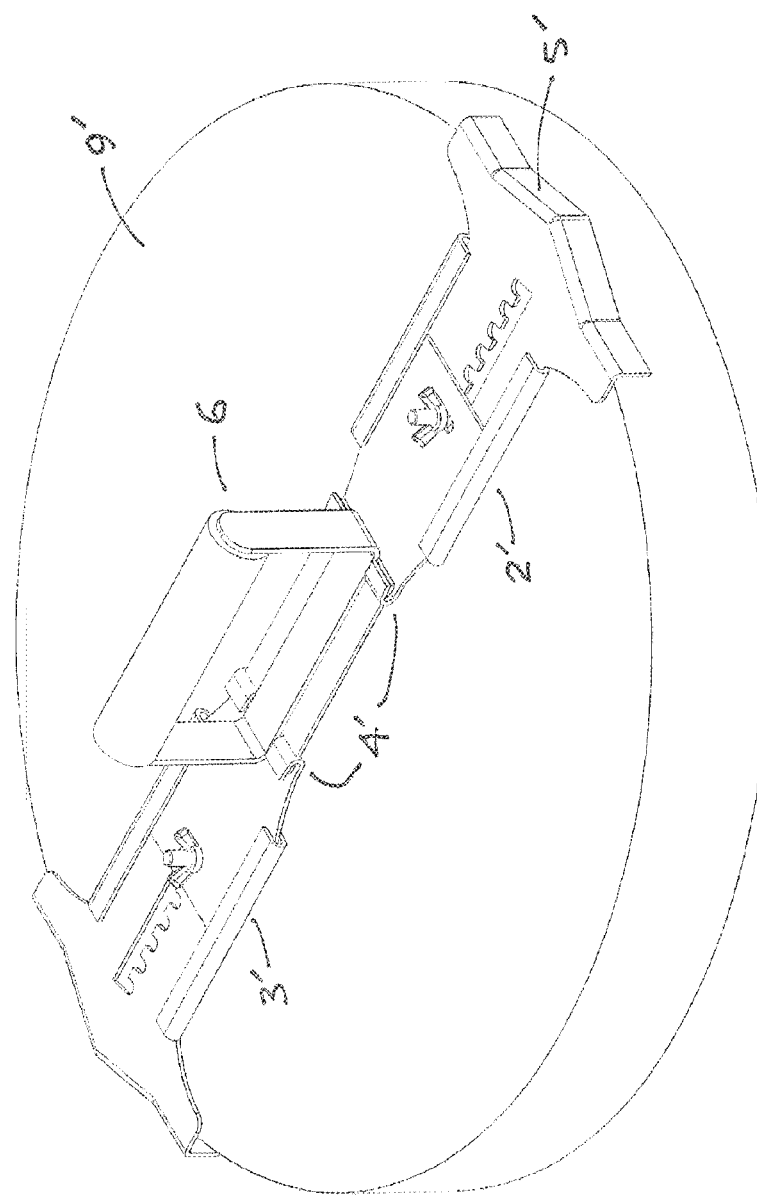
FIG. 9 is a perspective view of the variation, shown carrying a round patio stone.
Figure 10:
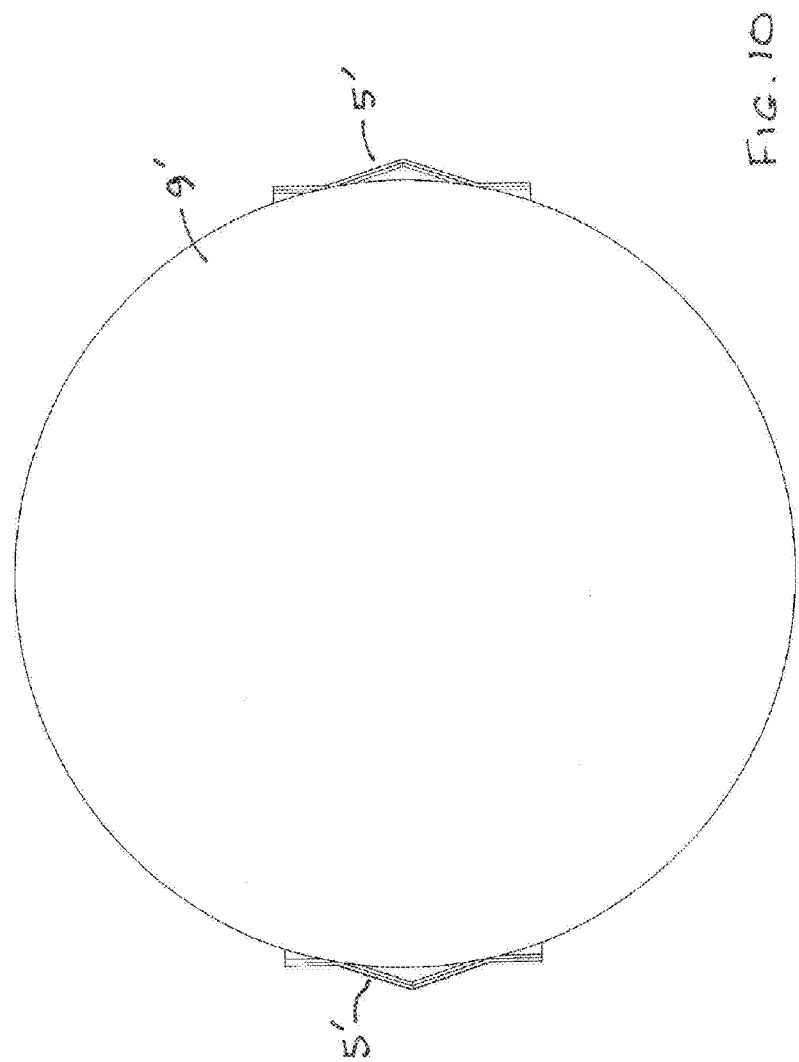
FIG. 10 is a bottom view corresponding to FIG. 9.
Figure 11:
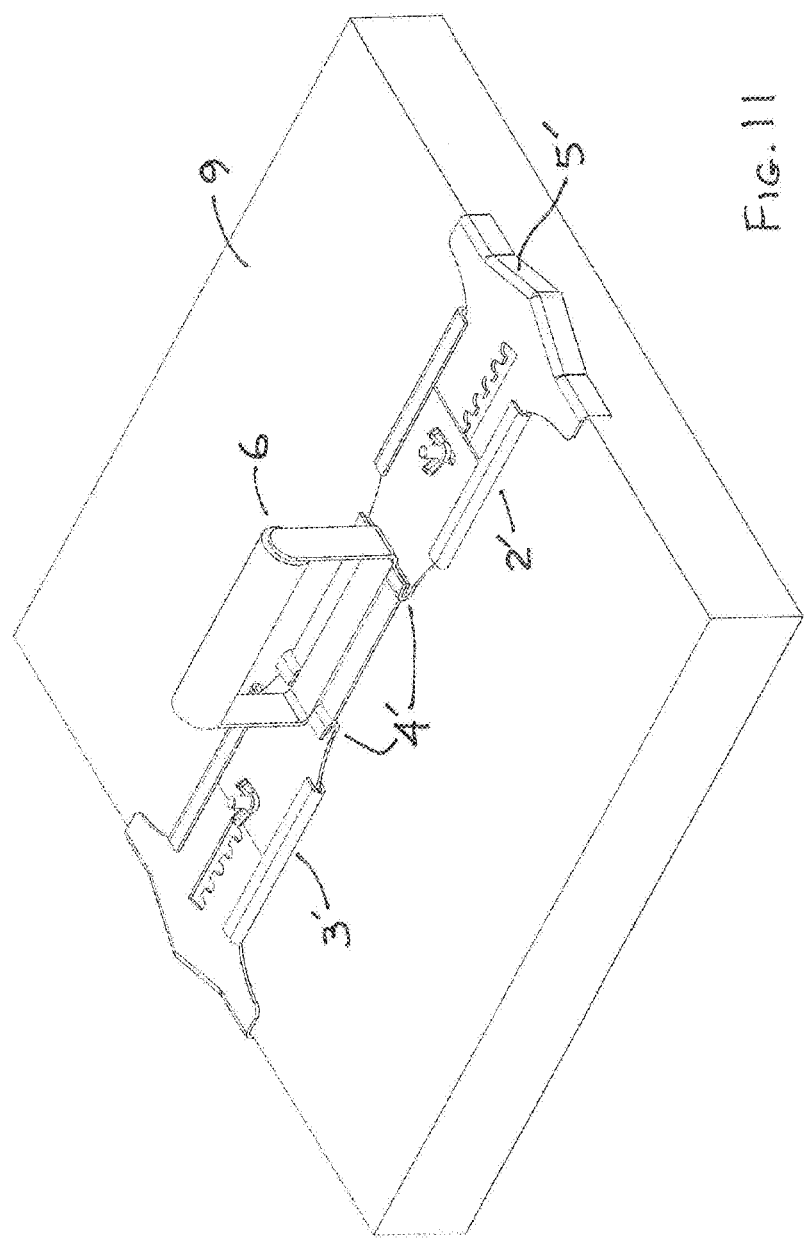
FIG. 11 is a perspective view of the variation, shown carrying a square patio stone.

FIGS. 8-11 show a variation in the downward projections 5, where the downward projections 5' are configured to accommodate either irregular, round or oblong shapes. FIGS. 9 and 10 show the device lifting a round patio stone 9', and FIG. 11 shows it lifting an oblong patio stone 9.

Further variations may be apparent or become apparent to those knowledgeable in the field of the invention, and are within the scope of the invention as defined by the claims which follow.

One such variation is that the outer surfaces of the downward projections 5 may be provided with fixed or removable spacers or spacing pads (not shown), for use in situations where it is desired to precisely place patio stones or the like at a fixed spacing from their neighbors. With or without spacers, the device does greatly facilitate accurate placement of the patio stone or other object, compared to placing the object by hand, where the person's fingers interfere.

Figure 12:
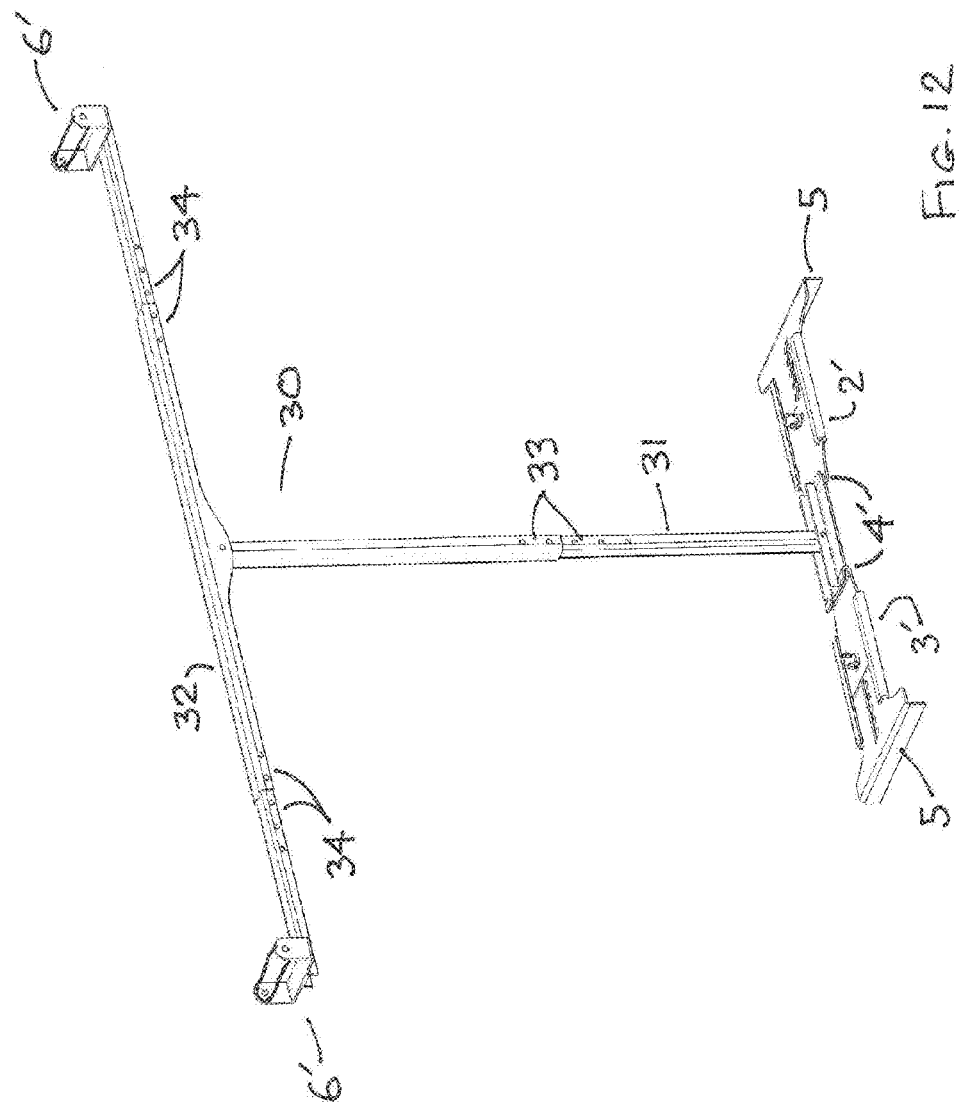
FIG. 12 is a perspective view of a two-person version, for larger or heavier objects.

A further variation is a two-person version, as illustrated in FIG. 12, for especially heavy objects. The "working end" of the device can be any of the previous embodiments. However, in this version, instead of a single handle, a T-shaped extension 30 is provided, with the bottom (vertical) arm 31 of the T-shape attaching in place of the handle assembly of the other embodiments, and with two handles 6' at opposite ends of the upper (horizontal) part 32 of the T-shape. The bottom arm of the T-shape can be of any desired length, or could have a lockable telescopic mechanism 33 as illustrated, but conveniently is such that the handles are about waist height for a typical person. Similarly, the upper horizontal part 32 can have telescoping mechanisms 34.

Figure 13:
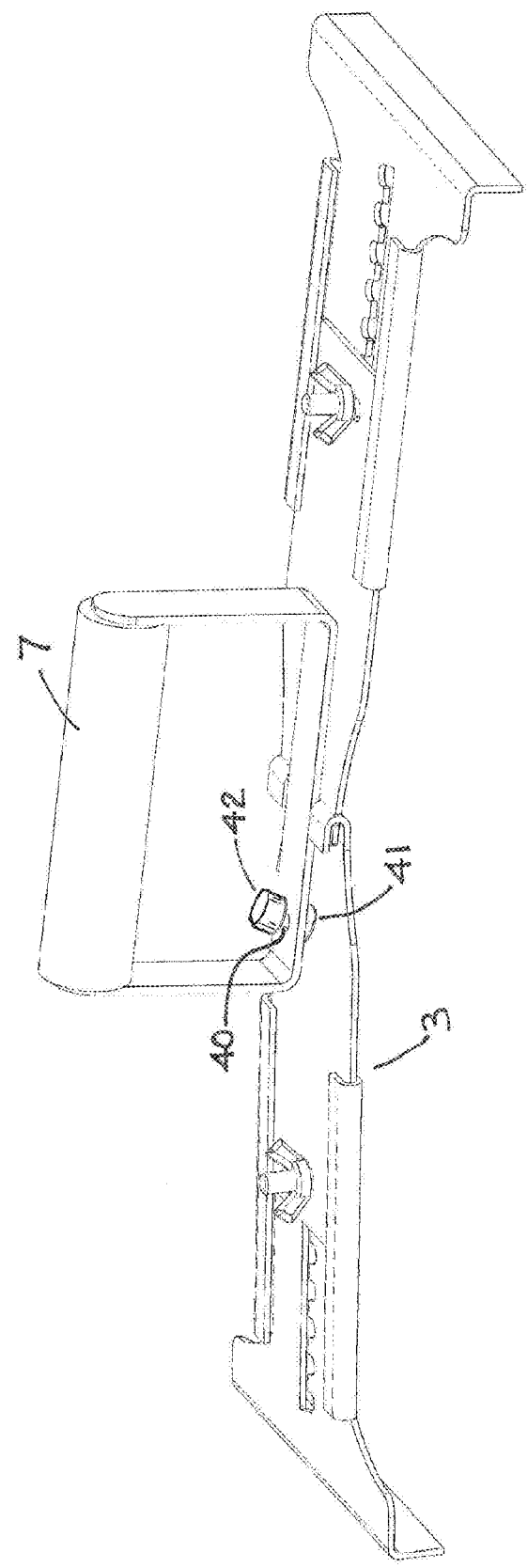
FIG. 13 is a perspective view illustrating a possible safety feature.
Figure 14:
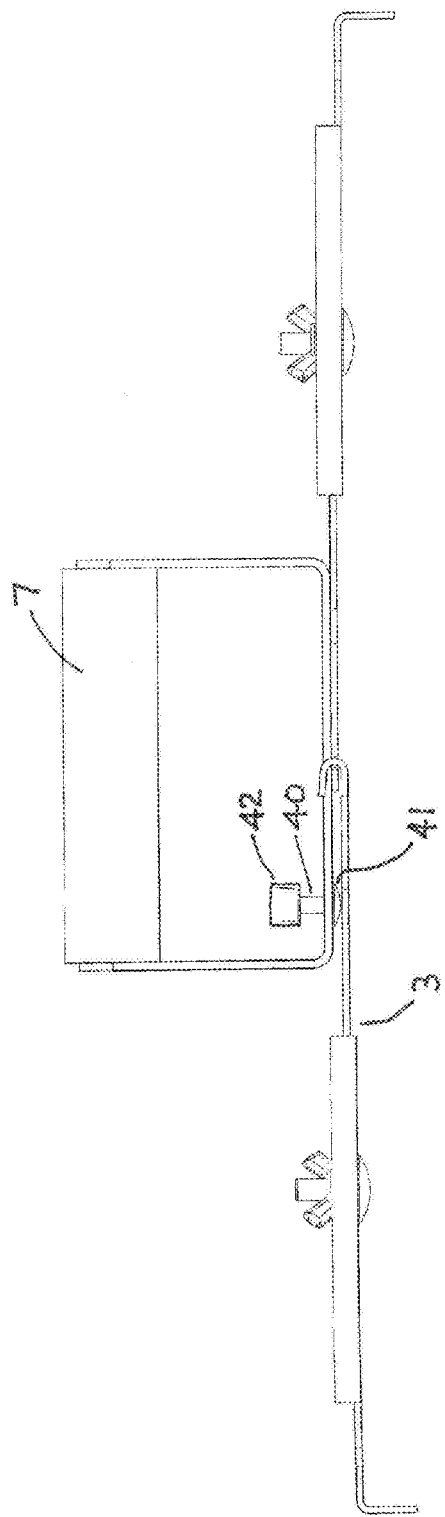
FIG. 14 is a side view showing the safety feature in a first position.
Figure 15:
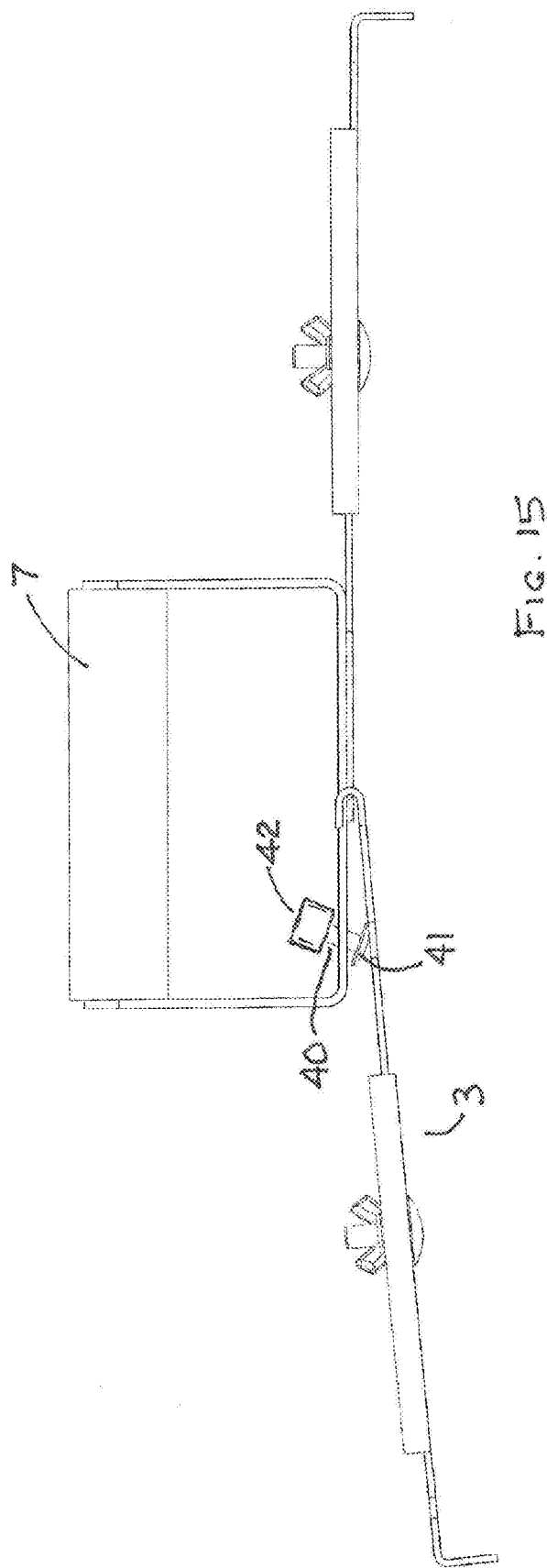
FIG. 15 is a side view showing the safety feature in a second position.

Another variation is a possible safety feature as illustrated in FIGS. 13-15. Generally, once an object is picked up by the device, it is not going to fall out. It is an advantage of the device that if the object is not securely gripped initially, it is far more likely to slip out right away than once it is actually lifted, since the gripping force becomes greater once the object is actually lifted, compared to when the lift is just beginning and the object is still at least partially in contact with the ground. However, looking at FIG. 15, it can be seen that if the person using the device sharply jerks the handle 7 (in a counterclockwise direction in this drawing), it could be possible to move the device from the position in FIG. 15 where the arms are angled and gripping the object securely, to the FIG. 14 position where the object may be unintentionally released. To guard against this possibility, it may be desirable to have means which prevent the arms from moving to the FIG. 14 position once in the FIG. 15 position. One possible such means is a pin 40 through a hole in the "free" end of the handle assembly, the pin having a rounded end which drops down against the arm 3 as soon as the arm moves to the FIG. 15 position. The pin and its rounded end 41 are configured such that the shaft of the pin is angled in the hole, the hole being elongated to permit that. Thus if the arm wants to move towards the FIG. 14 position, the pin is wedged at an angle in the hole, thereby preventing that movement. To remove the device from the object once the object has been lowered to the ground, the user has to lift the pin via the knob 42 on the top of the pin.

Figure 16:
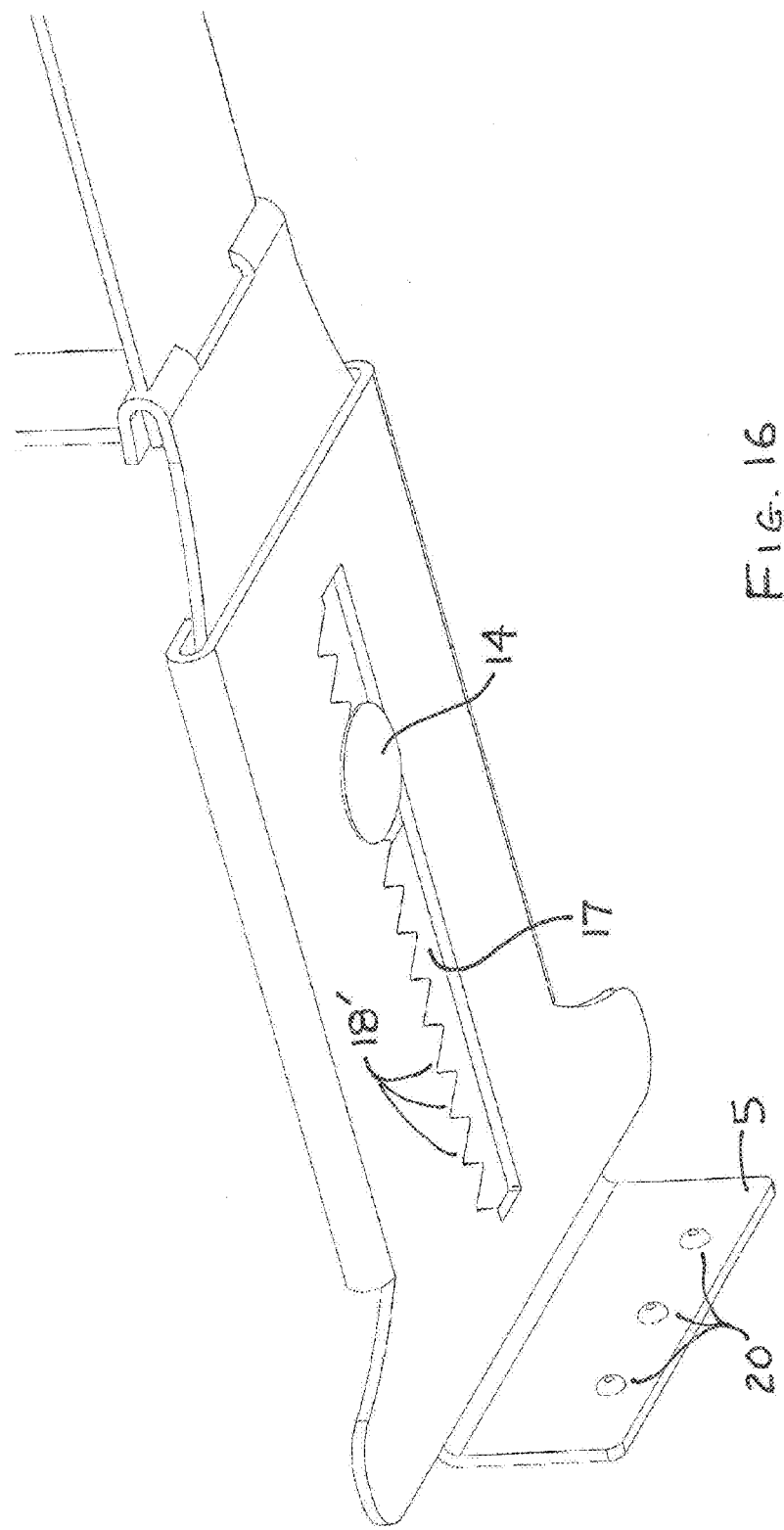
FIG. 16 is a perspective view of a variation of the device, from the underside thereof.

Yet another variation, as shown in FIG. 16, is that the downward projections 5 may be provided with one or more dimples 20 or other such means, to provide a more secure grip on the object. This may be particularly useful for smaller objects which do not weigh so much, and where the resulting forces thus forcing the downward projections inwardly against the object may not be great. The dimples in effect are pressure points to concentrate those forces and ensure adequate friction. Preferably the downward projections extend a little farther downwardly in this variation, to provide enough surface for the dimples to be a suitable distance down from the arms.

FIG. 16 also shows a variation which is also especially useful for smaller objects, where more adjustability in length of the device may be needed, to accommodate smaller variations in object sizes. That variation is that instead of large bays 18 to receive the bolt 14 or other securing means, the slot 17 may simply have a series of closely-spaced zig-zag recesses 18'. Though not at secure as the larger angled bays 18, this is generally not serious, since the device is for smaller objects, i.e. where the consequences of dropping the object are not serious.

Figure 17:
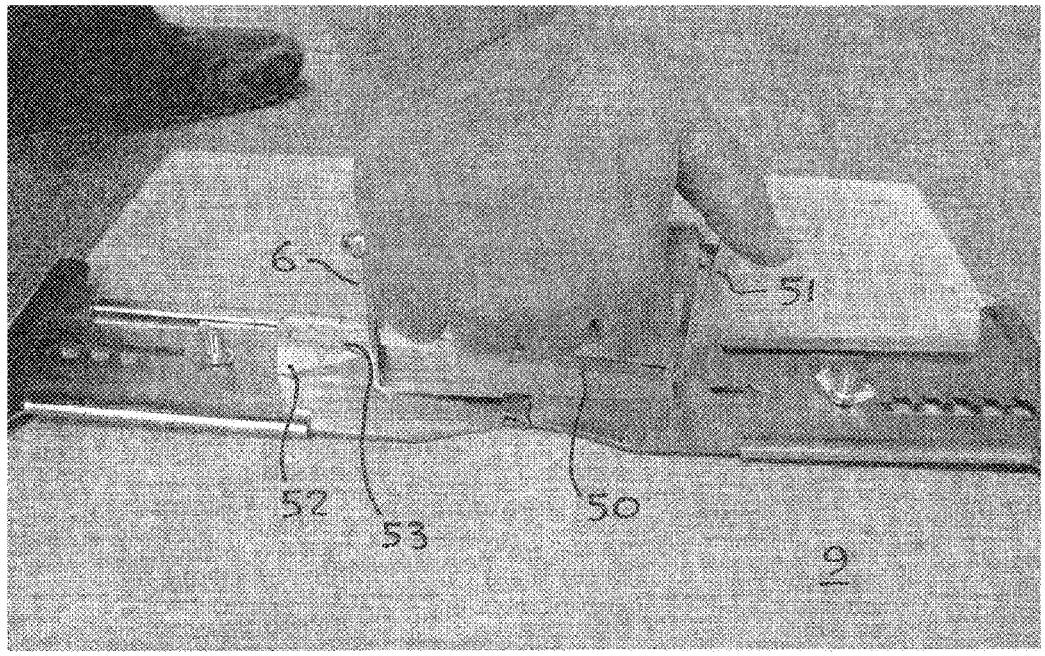
FIG. 17 is a perspective view of another possible safety mechanism, not engaged.
Figure 18:
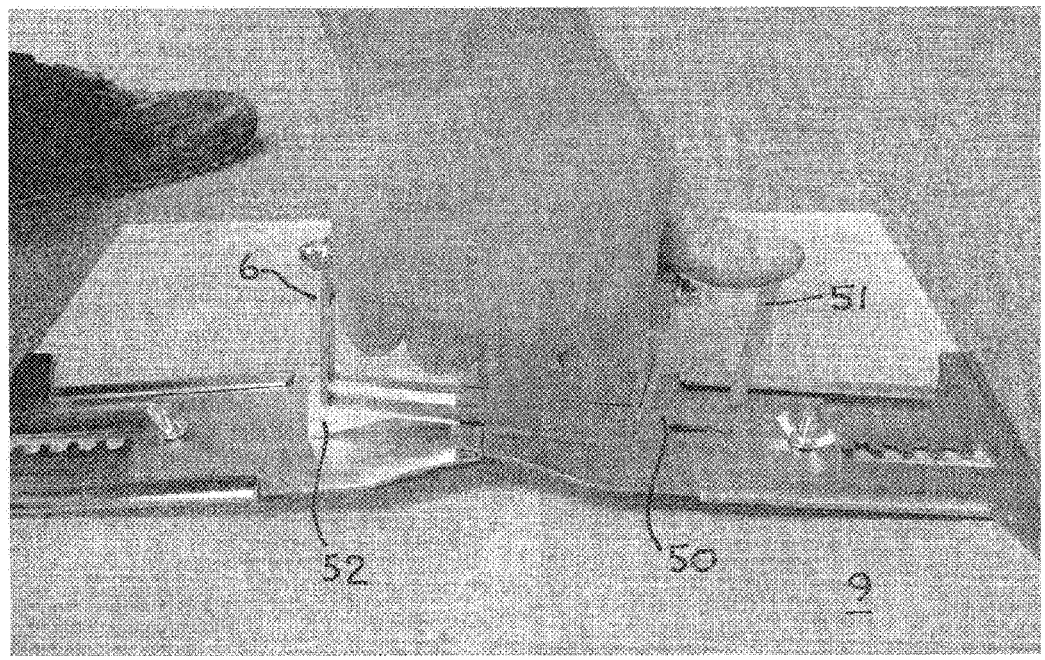
FIG. 18 is a perspective view of the same safety mechanism, engaged.

FIGS. 17 and 18 show another possible safety mechanism. In this mechanism, a locking bar 50 is slideable through slots in the handle assembly, and is thumb-actuated by an integral upright lever 51. The distal end of the locking bar has a cam portion 52 with a slot 53 facing the handle assembly 6. In the disengaged position, FIG. 17, the first and second arms 2 and 3 can be placed flat against the object (e.g. a patio stone 9). As the object is lifted (FIG. 18), the user slides the locking bar 50 forward (or it could be spring-biased forward), whereupon the slot 53 engages the handle assembly 6, i.e. the bottom flange of the handle assembly becomes positioned in the slot, and the cam portion 52 moves forward to rest against the second arm 3 so that the second arm cannot return to a released position until the lever 51 is moved to disengage the cam and slot from the handle assembly.

FIGS. 19-21 show a very similar safety mechanism. In this variation, the cam portion 52 has an angled upper surface 55, such that when the lever 51 is moved forward, from the position shown in FIG. 20 to the position shown in FIG. 21, the angled upper surface 55 causes the cam portion to move downwardly against the second arm 3, as a result of being in contact with the upper edge of a slot 56 in the handle assembly.

As with many tools and pieces of construction equipment, injury is possible if misused. In this case, misuse could result in a patio stone or the like falling on a worker's foot and potentially causing injury. Thus appropriate warning labels should be on the product to instruct the worker to wear appropriate safety footwear (e.g. steel-toed boots) and to ensure that the object is fully engaged by the device before lifting.

The invention claimed is:

1. A manual lifting device comprising:
a first arm, having a downward projection from a distal end thereof, said downward projection extending generally vertically when in use;
a second arm, pivotally connected to said first arm at respective proximal ends of said arms by at least one hinge, said second arm also having a downward projection from a distal end thereof, said downward projection extending generally vertically when in use;
a handle assembly mounted on one of said arms, having a handle extending generally over the center of gravity of the device; and
releasable means for preventing said arms from pivoting away from a position where an object is engaged for lifting, once so engaged, wherein said releasable means comprises a pin through a hole in a free end of said handle assembly, said pin having a bottom end which drops down against the arm to which the handle assembly is not attached once said arm is in a position engaging an object to be lifted, said pin and said hole being shaped such that said pin is angled in said hole such that said pin must be lifted by the user to move said arm to disengage said object; or said releasable means comprises a locking arm slideable through slots in said handle assembly, a distal end of the locking arm having a cam portion which engages the arm to which the handle assembly is not attached once said arm is in a position engaging an object to be lifted, such that said locking arm must be disengaged by the user to move said arm to disengage said object;
whereby positioning said device such that said downward projections loosely contact edges of an object to be lifted, and then lifting said handle, causes said arms to pivot downwardly relative to each other, thereby causing said downward projections to displace inwardly to grasp said object.

2. A manual lifting device as in claim 1, wherein said first and second arms are adjustable in length, whereby objects of various dimension may be lifted.

3. A manual lifting device as in claim 2, wherein each said hinge has a restricted range of motion such that the arms are maintained in a nearly operational position where said downward projections are close to their lifting positions and thus convenient for use.

4. A manual lifting device as in claim 1, wherein each said hinge has a restricted range of motion such that the arms are maintained in a nearly operational position where said downward projections are close to their lifting positions and thus convenient for use.

5. A manual lifting device as in claim 1, wherein the downward projections have inwardly-oriented protrusions.

6. A manual lifting device comprising:
a handle assembly;
a first arm pivotally connected to an outer end of said handle assembly, said first arm having a downward projection from a distal end thereof, said downward projection extending generally vertically when in use;
a second arm pivotally connected to an opposite outer end of said handle assembly, said second arm also having a downward projection from a distal end thereof, said downward projection extending generally vertically when in use; and
releasable means for preventing said arms from pivoting away from a position where an object is engaged for lifting, once so engaged, wherein said releasable means comprises a pin through a hole in a free end of said handle assembly, said pin having a bottom end which drops down against the arm to which the handle assembly is not attached once said arm is in a position engaging an object to be lifted, said pin and said hole being shaped such that said pin is angled in said hole such that said pin must be lifted by the user to move said arm to disengage said object; or said releasable means comprises a locking arm slideable through slots in said handle assembly, a distal end of the locking arm having a cam portion which engages the arm to which the handle assembly is not attached once said arm is in a position engaging an object to be lifted, such that said locking arm must be disengaged by the user to move said arm to disengage said object;
whereby positioning said device such that said downward projections loosely contact edges of an object to be lifted, and then lifting said handle, causes said arms to pivot downwardly relative to said handle assembly and each other, thereby causing said downward projections to rotate inwardly to grasp said object.

7. A manual lifting device as in claim 6, wherein said first and second arms are adjustable in length, whereby objects of various dimension may be lifted.

8. A manual lifting device as in claim 7, wherein each said hinge has a restricted range of motion such that the arms are maintained in a nearly operational position where said downward projections are close to their lifting positions and thus convenient for use.

9. A manual lifting device as in claim 6, wherein each said hinge has a restricted range of motion such that the arms are maintained in a nearly operational position where said downward projections are close to their lifting positions and thus convenient for use.

10. A manual lifting device as in claim 6, wherein the downward projections have inwardly-oriented protrusions.

* * * * *